United States Patent [19]

Nedblake et al.

[11] Patent Number: 5,087,498
[45] Date of Patent: Feb. 11, 1992

[54] MEAT L-BOARD

[76] Inventors: Greydon W. Nedblake, 40420 Claymont Woods Dr., Kansas City, Mo. 64116; Lawrence E. Johnson, 6504 N. Wabash, Gladstone, Mo. 64118

[21] Appl. No.: 508,950

[22] Filed: Apr. 12, 1990

[51] Int. Cl.$^5$ .............................................. B32B 3/00
[52] U.S. Cl. ...................................... 428/76; 428/101; 428/537.5; 426/124; 493/128
[58] Field of Search ................ 426/124; 493/128; 428/76, 101, 537.5

[56] References Cited

U.S. PATENT DOCUMENTS

| | | | |
|---|---|---|---|
| 4,125,633 | 11/1978 | Vander Lugt, Jr. | 493/128 |
| 4,371,553 | 2/1983 | Gilling et al. | 426/124 |
| 4,375,482 | 3/1983 | Maroszek et al. | 426/124 |
| 4,841,712 | 6/1989 | Roou | 53/412 |

*Primary Examiner*—Patrick J. Ryan
*Attorney, Agent, or Firm*—Hovey, Williams, Timmons & Collins

[57] ABSTRACT

A sanitary L-board (10) for use in bacon packages or the like is provided which includes a relatively large bacon-supporting baseboard section (12) and a juxtaposed, pivotal flap (14) adjacent one margin of the section (10). The section (12) and flap (14) are enclosed by means of a pair of flexible, transparent, synthetic resin sheets (16, 18) which are adhesively interconnected at the outer peripheries thereof. The section (12) and flap (14) may be spaced apart with the interconnected sheets (16, 18) defining a hinge to facilitate pivotal movement of the flap (14).

13 Claims, 1 Drawing Sheet

MEAT L-BOARD

BACKGROUND OF THE INVENTION

1. Field of the Invention

The present invention is broadly concerned with an improved, sanitary board assembly useful in the packaging of sliced bacon and sometimes referred to in the art as a "L-board". More particularly, it is concerned with such a bacon-supporting board assembly which preferably includes a relatively large, rectangular sheet-like baseboard section designed to hold and support bacon along with a narrower, elongated, sheet-like flap pivotally mounted with respect to the baseboard section; the baseboard and flap portions of the L-board are cased within an enclosure defined by a pair of opposed, flexible, transparent synthetic resin sheets which are adhesively interconnected about their peripheries. In this fashion, the board is completely sanitary and avoids the problems of "wicking" common in prior bacon boards, and moreover printing or other indicia can be applied to the boards without fear of contaminating the bacon product.

2. Description of the Prior Art

In the packaging of sliced bacon, most processors make use of L-boards adapted to support and advantageously display the bacon product. Conventional L-boards of this category include a relatively large, apertured baseboard section, together with a flap with may be attached to the main board along a line of weakness of perforation, so as to permit pivoting of the flap relative to the baseboard section. In use, sliced bacon is placed in a shingled relationship on the main baseboard section, and the flat is pivoted over the uppermost bacon strip. The supported bacon is then placed in an enclosing package for sale to the consumer.

Conventional bacon-supporting L-boards are manufactured from paper stock which has been provided with a wax-like coating on one surface thereof adapted to contact bacon, with a synthetic resin coating on the opposed surface. Such pre-coated board stock is then die cut into the desired board configuration, which also typically includes the scoring or perforation of the flap edge.

Conventional L-boards of the type described present a number of difficulties. First, a board stock used which is nonstandard and is therefore relatively expensive. More over, while the opposed surfaces of the boards are coated as described, the die cutting operation inherently exposes edge regions of the board which are completely uncoated. As a consequence, these boards suffer from the phenomenon known as "wicking" or the tendency of the uncoated butt edges of the boards to absorb grease from the bacon product which is unsanitary and unsightly as well.

Furthermore, a die cutting operation also generates small amounts of shreaded paper product which again is unsightly and unsanitary. Finally, the meat-supporting faces of the prior board cannot be effectively printed with advertising or other indicia because of the fear of meat contamination. Even though the opposed, polymer-coated surfaces can sometimes be printed, problems still arise because of the tendency of small amounts of ink to rub off, migrate through the package, and contaminate the meat product, especially after opening and handling of the package and L-board by the consumer.

SUMMARY OF THE INVENTION

The present invention overcomes the problems outlined above, and provides a greatly improved, completely sanitary L-board for supporting bacon or other products. The preferred meat boards of the invention includes the usual relatively large, sheet-like baseboard section together with an elongated, sheet-like flap of lesser width of that of the baseboard section and pivotal relative thereto, with the baseboard section and flap cooperatively presenting a pair of opposed surfaces of an outer periphery. However, the bacon boards of the invention are also provided with a pair of thin sheets in opposed relationship respectively engaging one of the opposed board surfaces presenting by the section and flap, each of the sheets having a surface area greater than that of the opposed board surfaces and each extending outwardly beyond the outer periphery thereof. The sheets are interconnected at their respective outer periphery for sealing the baseboard section and flat within a sanitary enclosure cooperatively defined by the sheets. In this fashion the board sections are completely separated from the bacon product, thereby allowing the packager to imprint both faces of the board with advertising or other information. At the same time, problems of wicking and/or board shredding common with prior bacon boards are completely eliminated.

In particularly preferred forms of the invention, the main baseboard section and flap are spaced apart from each other over a substantial portion of their common length, so that the interconnected, enclosing sheets serve, at least in part, as a hinge member between the section and flap. Advantageously, the baseboard section and flap are entirely separate with the outer sheets being interconnected in the region between these members so as to define a hinge.

DESCRIPTION OF THE PREFERRED EMBODIMENTS

Figure 2:
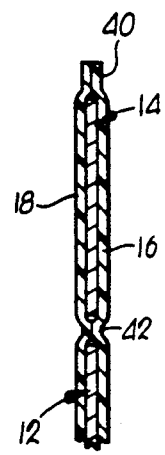
FIG. 2 is a sectional view taken along line 2—2 of FIG. 1 and further illustrating the details of construction of the L-board.
Figure 1:
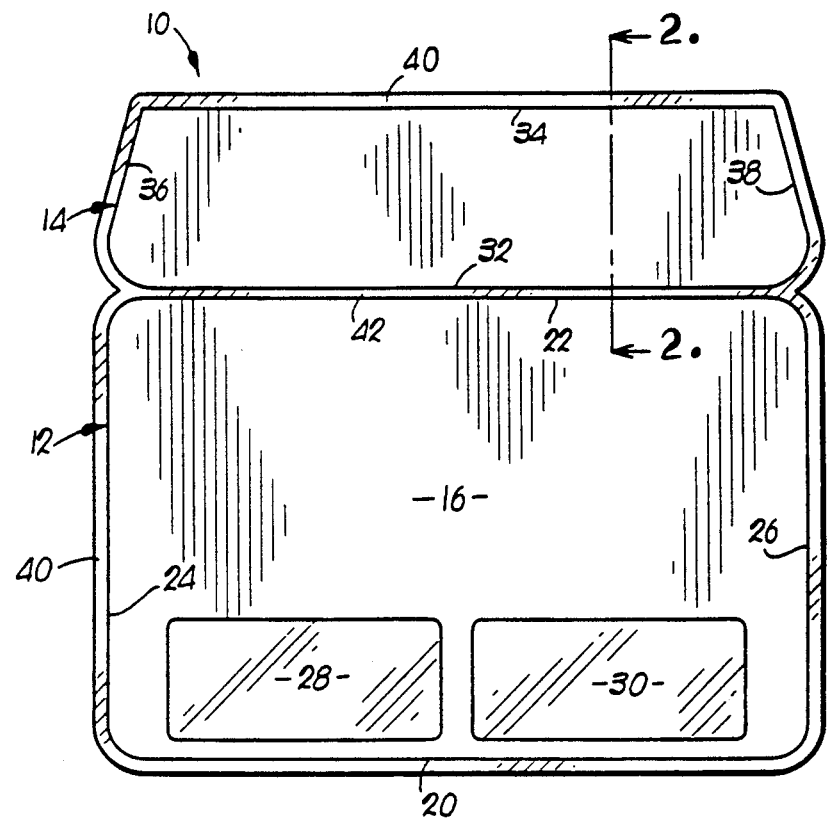
FIG. 1 is a plan view of a preferred bacon-supporting L-board in accordance with the invention.

Turning now to the drawings and in particular FIGS. 1-2, a bacon-supporting L-board 10 is illustrated. Broadly speaking, the board 10 includes a relatively large, generally rectangular, sheet-like baseboard section 12 formed of paper board stock, and an elongated, sheet-like flap 14 having a width less than that of the section 12, and a pair of facially opposed, transparent flexible synthetic resin cover sheets 16, 18.

In more detail, the baseboard section 12 is formed of light-weight standard, paper board stock and presents a forward margin 20, a rearward margin 22, and a pair of side margins 24, 26. A pair of relatively small, rectangular viewing windows 28, 30 are also provided in section 12 adjacent forward margin 20.

Flap 14 is formed of the same board stock as section 12, but is illustrated as substantially narrower. In this regard, flap 14 presents a forward edge 32, and an opposed rearward edge 34, and a pair of oblique interconnecting side edges 36, 38. It will be observed that the flap 14 is in spaced relationship from the section 12, with the forward edge 32 of the flap being in substantial parallelism and justaposition with rearward margin 22 of the section 12. Finally, it will be seen that the section 12 of flat 14 cooperatively present a pair of opposed surfaces of a given effective surface area, and an effective outer periphery.

Sheets 16, 18 are identical and as illustrated are in opposed relationship and respectively engaging one of the opposed surfaces presented by the section and flap. Each of sheets 16, 18 has a surface area slightly greater than that of the opposed board surfaces, and each extend outwardly beyond the effective outer periphery defined by the section and flap in order to present a continuous sealing region 40. To this end, the sheets 16, 18 are interconnected about the entirety of the sealing region 40 so as to effectively present an enclosure for the section 12 and flap 14.

In addition, it will be seen that the sheets 16, 18 are interconnected in the region 42 extending between and along the length of the flap edge 32 and section margin 22. This interconnection of the sheets 16, 18 at the region 42 presents a hinge between the section and flap, so that the latter maybe relatively pivoted during bacon packaging. Finally, it will also be seen that the sheets 16, 18 are connected in the cutout regions presented by the windows 28, 30.

In the use of board 10, bacon is first placed in a shingled relationship on baseboard section 12, whereupon flap 14 is pivoted into an overlying relationship above the uppermost bacon strip. In this configuration, the bacon and board are then placed within an enclosing container (not shown) such as clear film to form a package ready for ultimate sale to the consumer. Inasmuch as the board section 12 and flat 14 are completed enclosed within the sheets 16, 18 it will be appreciated that the board is completely sanitary. Further, use of the enclosing sheets permits the processor to imprint advertising or other indicia on either or both faces of the section or flap, without fear of contaminating the bacon product with printing ink.

Figure 3:
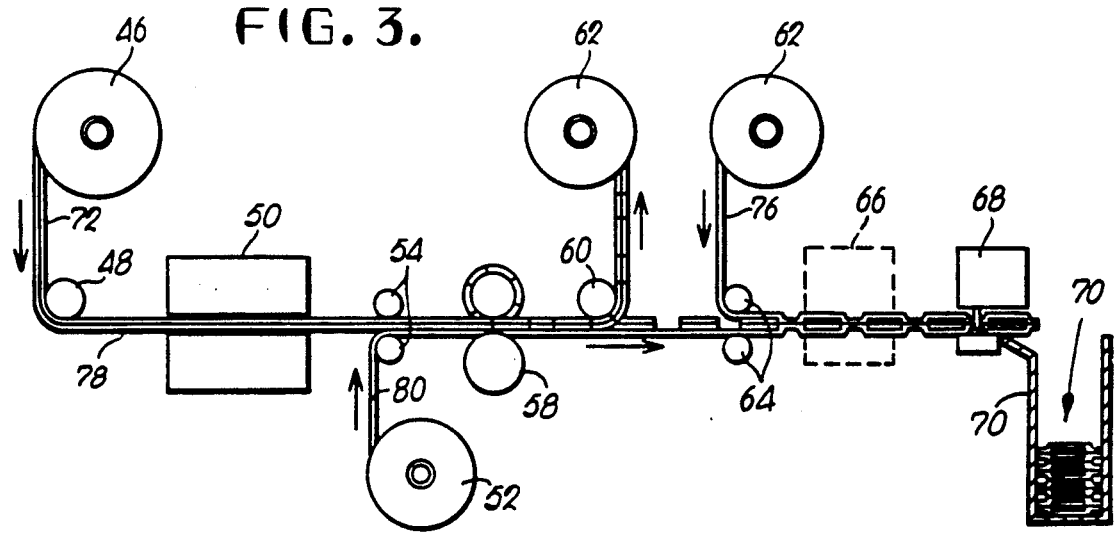
FIG. 3 is a schematic view illustrating the preferred method of fabricating the L-boards of the invention.

L-boards in accordance with the invention are advantageously produced by the method described and claimed in U.S. Pat. No. 4,841,712, which is incorporated herein by reference. Such method is illustrated by FIG. 3, which depicts a pressure sensitive label manufacturing machine 44 (such as the Webtron 650 manufactured by Webtron, Inc. of Fort Lauderdale, Fla.). The machine 44 includes a web dispensing reel 46, web guide roller 48, conventional flexographic printer 50, carrier sheet dispensing reel 52, a pair of carrier-web engagement rollers 54, die cutter 56, anvil roller 58, matrix-stripping roller 60, matrix takeup reel 62, a pair of top-carrier laminating rollers 64, an optional heat sealer 66, cutter 68 and collection rack 70.

Machine 44 is supplied with web 72, bottom or carrier sheets 74 and top sheets 60, all in roll form.

Web 72 is preferably composed of eightpoint tag material and maybe surface-coated on the upper surface thereof to facilitate printing. Additionally, web 72 includes a release liner or backing sheet 78 composed of 40 pound kraft material re moveably adhered to the lower surface of web 72 by means of an adhesive layer composed of conventional pressure sensitive adhesive.

Web dispensing reel 46 continuously dispenses the roll of web 72, including backing sheet 78, around web guide roller 48 through printer 50 in between carrier-web engagement rollers 54. Printer 50 may be used, for example, to print web 72 and backing sheet 78, with desired indicia and images.

Carrier sheet 74 is preferably received in the form of a roll of one mil., biaxially oriented polypropylene. Sheet 74 presents a top surface 80 which includes an adhesive coating thereon preferably composed of an acrylic emultion known as Type 15T10, available from Devon Corporation and which is oil, water and grease resistant.

Carrier sheet dispensing reel 52 continuously dispenses sheet 74 between carrier-web engagement rollers 54 so that the adhesive coating comes into contact with the lower surface of the web backing sheet 78. Engagement rollers 54 place web 72 and carrier sheets 74 in contact with one another so that the top surface 80 is adhered to the lower surface of backing sheet 78 by means of the adhesive coating.

Web 72 and carrier sheet 74 then continuously pass between die cutter 56 and anvil roller 58 so that die cutter 56 cuts through web 74 and backing sheet 78 in order to produce spaced apart sections 12 and flaps 14 surrounded by waste matrix.

Matrix takeup reel 62 continuously removes waste matrix by way of matrix-stripping rollers 60 which is in contact with the top surface of die cut web 72. After removal of waste metrix, spaced apart sections 12 and flap 14 remain in contact with an adhered to carrier sheets 74. The removal of waste matrix exposes portions of top surface 80 and the adhesive coating thereon, which portions marginly and continuously surround each section and flap. Moreover, such exposes portions lie between the mated sections and flaps, and within the die cut areas forming the windows 28, 30.

Carrier sheet 74 with the sections 12 and flaps 14 secured thereto then passes between top-carrier laminating rollers 64, along with top sheet 76. The latter is preferably in form of a wound roll of 75 gauge (¾ mil) corona-treated biaxially oriented polypropolene.

Top sheet dispensing roll 62 continuously dispenses the top sheet 76 between the rollers 64 which places the top sheet 76 in contact with the upper surface of the sections 12 and flaps 14 and with the exposed, adhesive-coated regions described previously. Preferably, top sheet 76 is the same width as carrier sheet 74 so as to assure good sealing contact between the sheets.

The rollers 64 serve to adhesively interconnect the sheets 76, 74 by virtue of the exposed, adhesive coated regions on the latter. Cutter 68 then trims the interconnected sheets 76, 74 and separates the individual, mated pairs of sections and flaps, in order to create the final L-boards 10. These are then collected within rack 70 as depicted.

In alternative procedures, the completed boards 10 may be rewound for shipment to a packager and subsequent separation and use. In addition, in certain applications use may be us of optional heat sealer 66. In such cases, a low tack adhesive would be used to adhere the webs with the heat sealer serving to complete the web interconnection.

It will thus be seen that the present invention provides a greatly improved bacon-supporting L-board which eliminates many of the persistant problems with conventional boards. In particular, the L-boards of the present invention are completely sanitary and may be used without fear of contaminating the bacon product, either by means of exposes paper board or printing ink.

We claim:

1. A sanitary L-board for supporting a food product within a package thereof, said L-board comprising:
   a flat baseboard presenting a surface area large enough for supporting the food product within the area thereof;
   a flat flap adjacent to said baseboard,
   said baseboard and flap being positioned to present an outer periphery and to present inner and outer, opposed faces;
   a first cover sheet engaging said inner face in covering relationship therewith and presenting a first sealing portion extending continuously around said outer periphery; and
   a second cover sheet engaging said outer face in covering relationship therewith and presenting a second sealing portion extending around said outer periphery,
   said first and second sealing portions being sealed to one another to form a continuous seal around said periphery,
   said sheets thereby cooperatively presenting structure enclosing said baseboard and flap therebetween.

2. The L-board as set forth in claim 1, said sheets defining a hinge between said baseboard and flap for permitting relative pivotal movement therebetween.

3. The L-board as set forth in claim 1, said baseboard presenting an elongated rear margin, said flap presenting an elongated forward edge, said margin and edge being positioned in an adjacent, spaced relationship, and sheets being secured together in the space between said margin and edge for defining a hinge between said baseboard and flap.

4. The L-board as set forth in claim 1, said baseboard and flap being adhesively secured to at least one of said sheets.

5. The L-board as set forth in claim 1, said baseboard including structure defining a viewing window therethrough, said sheets being substantially transparent and adhesively secured together within said window.

6. The L-board as set forth in claim 1, said first and second sealing portions being adhesively sealed to one another.

7. A food product package comprising:
   a flat baseboard presenting a surface area large enough for supporting the meat product within the area thereof;
   a flat flap adjacent to said baseboard, said baseboard and flap being positioned to present an outer periphery and inner and outer, opposed faces and to present a juncture therebetween;
   a second cover sheet engaging said outer face in covering relationship therewith and presenting a second sealing portion extending around said outer periphery, said first and second sealing portions being sealed to one another to form a continuous seal around said periphery, said sheets thereby cooperatively presenting structure enclosing said baseboard and flap therebetween;
   hinge means inner connecting said baseboard and flap for allowing pivotal movement of said flap relative to said baseboard at said juncture;
   a food product supported by said baseboard with a portion of said first cover sheet therebetween, and with said flap pivotally moved into covering relationship with at least a portion of said food product; and
   container means enclosing said baseboard, flap, cover sheets and hinge means to form a package.

8. The package as set forth in claim 7, said baseboard presenting an elongated rear margin, said flap presenting an elongated forward edge, said margin and edge being positioned in an adjacent, spaced relationship, said sheets being secured together in the space between said margin and edge thereby forming said hinge means.

9. The package as set forth in claim 7, said baseboard and flap being adhesively secured to at least one of said sheets.

10. The package as set forth in claim 7, said baseboard including structure defining a viewing window therethrough, said sheets being substantially transparent and adhesively secured together within said window, said container means including substantially transparent film for viewing of said food product through said film and through said window.

11. The package as set forth in claim 7, said first and second sealing portions being adhesively sealed to one another.

12. The package as set forth in claim 7, said food product including a meat product.

13. The package as set forth in claim 12, said meat product including shingled, sliced bacon.

* * * * *

UNITED STATES PATENT AND TRADEMARK OFFICE
CERTIFICATE OF CORRECTION

PATENT NO. : 5,087,498

DATED : February 11, 1992

INVENTOR(S) : Wesley G. Nedblake and Lawrence E. Johnson

It is certified that error appears in the above-identified patent and that said Letters Patent is hereby corrected as shown below:

At Column 3, line 57, "top sheets 60" should read --top sheets 76--.

In the Drawing:

Fig. 3, additional reference numerals --44--, --56--, and --74-- are needed; one of the duplicated numbers "70" should be changed to --10--; and appropriate lead lines are needed, as per the attached revised drawing.

Signed and Sealed this

Thirteenth Day of April, 1993

Attest:

STEPHEN G. KUNIN

Attesting Officer     Acting Commissioner of Patents and Trademarks